United States Patent
Desjardins-Lavisse et al.

(10) Patent No.: US 9,017,746 B2
(45) Date of Patent: Apr. 28, 2015

(54) METHOD FOR OBTAINING A PRODUCT SEQUENTIALLY SUBMITTED TO GASIFICATION AND CRYOGENIC DEEP-FREEZING

(76) Inventors: Isabelle Desjardins-Lavisse, Henrichemont (FR); Stephane Desobry, Saint Remimont (FR); Eric Uhrig, Ottange (FR); Laurent Probst, Tomblaine (FR)

( * ) Notice: Subject to any disclaimer, the term of this patent is extended or adjusted under 35 U.S.C. 154(b) by 0 days.

(21) Appl. No.: 12/444,971

(22) PCT Filed: Oct. 9, 2007

(86) PCT No.: PCT/FR2007/001641
§ 371 (c)(1),
(2), (4) Date: Apr. 9, 2009

(87) PCT Pub. No.: WO2008/043909
PCT Pub. Date: Apr. 17, 2008

(65) Prior Publication Data
US 2010/0055285 A1 Mar. 4, 2010

(30) Foreign Application Priority Data
Oct. 9, 2006 (FR) .................... 06 08820

(51) Int. Cl.
*A23G 9/46* (2006.01)
*A23L 3/375* (2006.01)
(52) U.S. Cl.
CPC ............. *A23L 3/375* (2013.01); *A23V 2300/20* (2013.01); *A23V 2250/124* (2013.01)
(58) Field of Classification Search
USPC .......................................... 426/11
See application file for complete search history.

(56) References Cited

U.S. PATENT DOCUMENTS

| 2,975,603 | A | | 3/1961 | Barnes et al. | |
|---|---|---|---|---|---|
| 4,659,575 | A | * | 4/1987 | Fiedler | 426/317 |
| 5,126,156 | A | * | 6/1992 | Jones | 426/418 |
| 6,436,460 | B1 | * | 8/2002 | Daniel et al. | 426/565 |
| 2006/0159821 | A1 | * | 7/2006 | Brisson et al. | 426/565 |

FOREIGN PATENT DOCUMENTS

| DE | 197560677 | * | 11/1997 | ............... A23P 1/06 |
|---|---|---|---|---|
| GB | 1095004 | | 12/1967 | |
| JP | 60054664 | | 3/1985 | |
| JP | 03059372 | | 3/1991 | |
| JP | 06343398 | | 12/1994 | |
| WO | WO 94/28736 | * | 12/1994 | ............... A23F 5/32 |
| WO | 9529597 | * | 11/1995 | ............... A23G 9/32 |

OTHER PUBLICATIONS

Lebail et al, High Pressure Freezing and Thawing of Foods: A Review, International Journal of Refrigeration 25 (2002) 504-513.*
DE197560677 (partial translation), Nov. 1997, Beyer, A23 P 1/6.*
Katri Iivone, Liquid Nitrogen Deep-Freezing in The Food Industry, accessed at http://www.gasworld.com/liquid-nitrogen-deep-freezing-in-the-food-industry/573.article).*

* cited by examiner

*Primary Examiner* — D. Lawrence Tarazano
*Assistant Examiner* — Philip Dubois
(74) *Attorney, Agent, or Firm* — Cantor Colburn LLP

(57) ABSTRACT

The invention relates to a method for obtaining a product in the form of deep-frozen granules, particles of beads having a high dissolved-gas content from a liquid, semi-liquid or paste-like matrix, that comprises two subsequent steps: a matrix gasification step that comprises the incorporation of gas at a pressure higher than 2 bars; and a quick deep-freezing step using a cryogenic fluid.

5 Claims, No Drawings

METHOD FOR OBTAINING A PRODUCT SEQUENTIALLY SUBMITTED TO GASIFICATION AND CRYOGENIC DEEP-FREEZING

FIELD OF THE INVENTION

The present invention relates to a method for obtaining a product sequentially submitted to gasification and cryogenic deep-freezing.

More precisely, the invention relates to a general method that combines two consecutive single step operations of gasification and cryogenic deep-freezing of food-grade or none food-grade matrices or products, which were initially in the form of liquids, semi-liquids or pastes. This method enables the production of particles, such as beads or granules, which can be used or consumed once brought to a positive temperature.

BACKGROUND OF THE INVENTION

The incorporation of gas under a pressure of more than 2 bars in a liquid or paste enables substantial quantities of gas to dissolve and which are subsequently trapped in the matrix on deep-freezing.

This incorporation of gas can be carried out with nitrogen, nitrous oxide, carbon dioxide, a noble gas such as argon or a mixture of these gases.

Various devices have already been described for adding gas into a food-grade or non food-grade matrix.

Thus, a device for creating mini-bubbles in a liquid is described in the patent EP 1 594 599. The device comprises a gas/liquid mixing space that communicates with a gas inlet and a disk, and means for bringing the gas/liquid mixture into contact with one of the faces of the disk.

A device for the preparation of a spumescent liquid with gaseous oxygen is described in the patent EP 1 486 129. This device operates under pressure and aseptically generates and stabilises the bubbles in the liquid.

Deep-freezing is a known method for preserving foods or non-foodstuffs for very long periods, without significantly modifying them.

Thus, a device for slowly deep-freezing immiscible droplets comprised in a liquid having a temperature gradient going from ambient temperature to below the freezing point of the liquid is described in the patent GB 1 304 045.

A device for condensing coffee aromas by means of a cryogenic liquid is described in the patent EP 201 698. A process for deep-freezing fruit juices for the production of frozen beads without gasification is described in the patent ES 2194558.

A general method for the cryogenic deep-freezing of non-gasified frozen dessert particles is described in the U.S. Pat. No. 6,349,549.

A production process for particles of a frozen product after gasification under high pressure, i.e. above 1000 bar, is described in the patent JP 0420203869.

DETAILED DESCRIPTION OF THE INVENTION

The invention proposes a method that can both gasify a more or less liquid matrix by incorporating a dissolved gas by injecting gas under a pressure greater than 2 bar and then deep-freezing said matrix.

Accordingly, the present invention is a method for obtaining a product in the form of deep-frozen granules, particles or beads, which are rich in dissolved gas, starting from a liquid, semi-liquid or pasty matrix, said method comprising two consecutive steps:
  a gasification step of the matrix by injecting gas dissolved under a pressure between 2 and 10 bar,
  a rapid deep-freezing step by cryogenic fluid.

The method according to the invention does not consist of an expansion, but in the simple creation of an equilibrium of a food-grade matrix and a pressurised gas, and then a cryogenic deep-freezing of the gasified matrix so as to form deep-frozen particles, such as spheres or other shapes.

The pressures utilised for this method are comprised between 2 and 10 bar and no release of gas is targeted during the deep-freezing. The resulting beads or particles are compact such that the release of the gas occurs at the moment when the temperature is restored and not in the installation during deep-freezing.

The method carries out the gasification of a matrix and its rapid deep-freezing in series, such that particles, granules or beads are produced which contain the dissolved gas. These particles, granules or beads are stable during storage in the frozen state and enable foams or bubbles to be produced from the final product as it is returned to a positive temperature (temperature above 1° C.).

The temperature can be restored by slow thawing to a positive temperature or very rapidly by heating or cooking (microwave oven, traditional oven or other appropriate means of heating).

The first step of the method consists in gasifying the selected matrix.

This step is accomplished by injecting or flushing with gas, particularly nitrogen, nitrous oxide, argon, carbon dioxide or other suitable gas. The method enables a high amount of gas to dissolve in the liquid, semi-liquid or pasty matrix.

The second step of the method concerns the instantaneous deep-freezing of the gasified matrix by means of liquid nitrogen or liquid carbon dioxide or any other appropriate cryogenic fluid.

It is carried out at a pressure of more than 2 bar so as to ensure that the dissolved gas is well retained.

This deep-freezing can be carried out individually, in bulk, then ground, or in the form of deep-frozen granules, enabling the production of drops or droplets that are then deep-frozen.

The resulting elements can have a varied size range that subsequently allows bubbles, foams or multi-phase products to be obtained.

The average diameter of the resulting particles, granules and beads can range from 1 mm to 2 cm.

The third step is the recovery of the granules or other shapes by a mechanical and/or automated means.

The last step of the method relates to its packaging in the form of granules, beads or other shape in a packaging, then its storage at a temperature between −18 and −30° C.

The thus gasified and deep-frozen product is then thawed by any appropriate type of reheating, going from allowing it to return to a positive temperature to heating it close to boiling. The product obtained in this manner is in the gasified form or with a foam at the surface depending on the size of the beads, granules and other particles formed during the gasification.

The method according to the invention retains the integrity of the starting food or beverage during its cold storage, notably in regard to its organoleptic and physico-chemical properties.

This method also enables multi-phase foods to be obtained once the temperature is restored. These phases can consist of superimposed layers having different compositions and/or different textures according to the type of product being processed.

The method according to the invention can be applied to food products, notably beverages. In fact, it enables the consumer to prepare a frothy espresso coffee, or a creamy milk chocolate without the need for complicated equipment. It also enables refreshing flavoured beverages to be prepared, such as gasified (carbonated) fruit juices, without adding carbonated water or soda, with or without a phase separation of the constituents, refreshing flavoured beverages by adding still water to the gasified beads of syrup enabling in addition the water to be cooled down as the beads melt.

After the product in the form of a liquid or a paste has been gasified and deep-frozen, the method according to the invention enables e.g. a frothy espresso coffee to be obtained by simply restoring the temperature, by reheating in a microwave oven or by other applicable methods.

The method for gasification and deep-freezing of more or less liquid foods can be used for other possible applications below: flavoured or unflavoured coffees, cappuccino, hot chocolate, tea with milk, still or sparkling drinks based on syrups, still or sparkling drinks based on freshly squeezed fruit or vegetables, alcoholic or non-alcoholic cocktails. In the last case, the return to temperature can yield bi-phases or tri-phases depending on the density and the miscibility of the gasified elements.

The method can also be applied to thick liquid foods, such as soups, sauces, dessert creams, stewed fruit, or to fruit or vegetable purees.

Pasty foods can also be gasified and deep-frozen. They can be cake mixes, savoury mixes for tarts, quiche or gratin, fondant mixes, mixes for verrines.

The method according to the invention can also be used for non-comestible products.

The object and advantages of the invention are to obtain food preparations that are totally ready for use, not requiring any processing or handling by a consumer and without the production of any type of waste. The preparations are available by simply attaining room temperature or by reheating by any known method.

The cited preparations are totally natural, free of additives or of residual substances; after thawing, the dissolved gas escapes from the matrix structure, thereby forming a foam or micro bubbles.

Finally, both from the physical and organoleptic point of view, the preparations in question are absolutely true to the relevant product that requires a complicated production process:

By way of example, one can obtain a coffee of optimum quality of the espresso type in places without any running water and without mechanical resources (pressurised machines).

Although the invention has been described by way of specific embodiments, it encompasses all the technical equivalents of the described means.

The invention claimed is:

1. A method for obtaining a deep-frozen product starting from a liquid matrix, the method comprising:
   a gasification step of the liquid matrix by incorporating gas under a pressure between 2 bar and 10 bar in order to dissolve gas in the liquid matrix, wherein said gas is one of nitrogen, nitrous oxide, and a noble gas;
   a deep-freezing step of the liquid matrix after the gasification step with liquid nitrogen, the deep-freezing step occurring at a pressure between 2 bar and 10 bar; and
   obtaining the deep-frozen product in a form of deep-frozen granules, particles or beads, which are dense contain dissolved gas and have a size of 1 mm-2 cm.

2. The method for obtaining a product according to claim 1, wherein the particles, granules or beads that form the product are obtained by individual deep-freezing or by bulk deep-freezing followed by grinding.

3. The method for obtaining a product according to claim 1, further including heating said granules, particles or beads in order to form a frothy hot drink, a gasified cool drink with or without a phase separation between constituents, or a sauce or dessert.

4. The method for obtaining a product according to claim 1, wherein said granules, particles or beads are dense in that said granules, particles or beads are non-porous.

5. A method for obtaining a deep-frozen product starting from a matrix having a liquid, semi-liquid or a pasty viscosity, the method comprising:
   a gasification step of the matrix having the liquid, semi-liquid or pasty viscosity by incorporating gas under a pressure between 2 bar and 10 bar in order to dissolve gas in the matrix, wherein said gas is one of nitrogen, nitrous oxide, and a noble gas;
   a deep-freezing step of the matrix after the gasification step with liquid nitrogen, the deep-freezing step occurring at a pressure between 2 bar and 10 bar; and
   obtaining the deep-frozen product in a form of deep-frozen granules, particles or beads, which are dense contain dissolved gas.

* * * * *